United States Patent
Richards et al.

(10) Patent No.: US 10,592,957 B2
(45) Date of Patent: Mar. 17, 2020

(54) ANALYZING USER ACCESS OF MEDIA FOR MEAL PLANS

(71) Applicant: Walmart Apollo, LLC, Bentonville, AR (US)

(72) Inventors: Mark Darrin Richards, Springdale, AR (US); Bruce Walter Wilkinson, Rogers, AR (US)

(73) Assignee: Walmart Apollo, LLC, Bentonville, AR (US)

(*) Notice: Subject to any disclaimer, the term of this patent is extended or adjusted under 35 U.S.C. 154(b) by 654 days.

(21) Appl. No.: 15/213,059

(22) Filed: Jul. 18, 2016

(65) Prior Publication Data
US 2017/0024798 A1 Jan. 26, 2017

Related U.S. Application Data

(60) Provisional application No. 62/194,496, filed on Jul. 20, 2015.

(51) Int. Cl.
*G06Q 30/06* (2012.01)

(52) U.S. Cl.
CPC . *G06Q 30/0631* (2013.01); *G06F 2200/1637* (2013.01)

(58) Field of Classification Search
CPC .................................. G06Q 30/0601–0645
USPC ............................................... 705/26.1–27.2
See application file for complete search history.

(56) References Cited

U.S. PATENT DOCUMENTS

| 5,832,446 A | 11/1998 | Neuhaus |
| 6,381,614 B1* | 4/2002 | Barnett ............ G06F 17/30 707/104.1 |
| 6,980,999 B1 | 12/2005 | Grana |
| 7,177,825 B1 | 2/2007 | Borders et al. |

(Continued)

FOREIGN PATENT DOCUMENTS

| EP | 2688308 | 1/2014 |
| WO | WO 200206984 A2 | 1/2002 |
| WO | WO 2017/015229 A1 | 1/2017 |

OTHER PUBLICATIONS

LG Electronics USA; LG to Introduce Connected, Easy-To-Control Smart Appliances at CES 2013, Jan. 16, 2013, Journal of Engineering [Atlanta] (Year: 2013).*

(Continued)

*Primary Examiner* — Resha Desai
*Assistant Examiner* — Kennedy Gibson-Wynn
(74) *Attorney, Agent, or Firm* — Patterson Thuente Pedersen, P.A.

(57) ABSTRACT

A system selects meals according to a user's tastes and presents media files instructing execution of the meal. The media file is presented as a set of segments, each segment having a thumbnail image and metadata associated therewith. User interactions with the segments are monitored and evaluated to determine whether the segments are viewed, viewed for inspiration, and/or viewed while executing the meal. Actions monitored and evaluated may include movement of a user device during a viewing, pausing of playback, appropriateness of pausing locations to meal preparation steps, and orientation of the device. The metadata of segments and the viewing status thereof is used to determine a user's tastes and skill level to facilitate selection of subsequent meals for the user.

16 Claims, 6 Drawing Sheets

(56) References Cited

U.S. PATENT DOCUMENTS

| | | | |
|---|---|---|---|
| 8,015,076 B2 | 9/2011 | Owens | |
| 8,249,946 B2 | 8/2012 | Froseth et al. | |
| 8,504,440 B1* | 8/2013 | Kolawa | G06Q 30/00 705/26.7 |
| 8,705,932 B2 | 4/2014 | Medhurst | |
| 8,972,043 B2 | 3/2015 | Foster et al. | |
| 8,990,274 B1* | 3/2015 | Hwang | G06Q 10/06 708/133 |
| 9,165,320 B1 | 10/2015 | Belvin | |
| 9,280,640 B2 | 3/2016 | Nusbaum et al. | |
| 9,898,788 B1 | 2/2018 | Calargun et al. | |
| 2002/0046060 A1 | 4/2002 | Hoskyns et al. | |
| 2004/0054572 A1 | 3/2004 | Oldale et al. | |
| 2004/0077381 A1* | 4/2004 | Engstrom | H04M 1/00 455/566 |
| 2005/0144066 A1 | 6/2005 | Cope et al. | |
| 2006/0019915 A1 | 1/2006 | Fanzo et al. | |
| 2006/0020614 A1 | 1/2006 | Kolawa et al. | |
| 2006/0175403 A1 | 8/2006 | McConnell et al. | |
| 2006/0199155 A1 | 9/2006 | Mosher | |
| 2007/0141540 A1 | 6/2007 | Borg | |
| 2007/0174151 A1 | 7/2007 | Anderson et al. | |
| 2008/0086374 A1 | 4/2008 | Aitken | |
| 2008/0133724 A1 | 6/2008 | Clark | |
| 2009/0106124 A1 | 4/2009 | Yang | |
| 2009/0150241 A1* | 6/2009 | Laboise | G06Q 30/0224 705/14.25 |
| 2009/0181131 A1 | 7/2009 | Forbes-Roberts | |
| 2009/0234839 A1 | 9/2009 | Angell et al. | |
| 2009/0259687 A1 | 10/2009 | Do et al. | |
| 2009/0307007 A1 | 12/2009 | Hermann et al. | |
| 2010/0121807 A1 | 5/2010 | Perrier et al. | |
| 2010/0136508 A1 | 6/2010 | Zekhtser | |
| 2010/0292998 A1 | 11/2010 | Bodlaender | |
| 2011/0055044 A1* | 3/2011 | Wiedl | G06Q 30/02 705/26.5 |
| 2011/0218407 A1 | 9/2011 | Haberman et al. | |
| 2012/0054061 A1 | 3/2012 | Fok | |
| 2012/0095876 A1 | 4/2012 | Miyashita | |
| 2012/0136751 A1 | 5/2012 | Ochtel | |
| 2012/0322032 A1 | 12/2012 | Smith | |
| 2013/0171304 A1 | 7/2013 | Huntley | |
| 2013/0191177 A1* | 7/2013 | Wiggins | G06Q 10/0633 705/7.27 |
| 2013/0224694 A1 | 8/2013 | Moore et al. | |
| 2013/0238451 A1 | 9/2013 | Riscalla | |
| 2013/0295531 A1* | 11/2013 | Addanki | G09B 19/00 434/127 |
| 2014/0122209 A1 | 5/2014 | Argue et al. | |
| 2014/0149239 A1* | 5/2014 | Argue | G06Q 20/20 705/21 |
| 2014/0172894 A1 | 6/2014 | Argue et al. | |
| 2014/0236759 A1 | 8/2014 | Mirabile | |
| 2014/0244209 A1* | 8/2014 | Lee | G01D 21/00 702/150 |
| 2014/0272816 A1 | 9/2014 | Callahan | |
| 2014/0272817 A1* | 9/2014 | Park | G09B 5/02 434/127 |
| 2014/0295822 A1 | 10/2014 | Koo et al. | |
| 2014/0324899 A1 | 10/2014 | Sherman et al. | |
| 2015/0073940 A1 | 3/2015 | Jo et al. | |
| 2015/0079551 A1 | 3/2015 | Egan | |
| 2015/0186836 A1 | 7/2015 | Chouhan et al. | |
| 2015/0187026 A1 | 7/2015 | Holman et al. | |
| 2015/0208858 A1* | 7/2015 | Robbins | A47J 45/068 426/231 |
| 2015/0228062 A1 | 8/2015 | Joshi et al. | |
| 2015/0324882 A1 | 11/2015 | Ouimet | |
| 2015/0379601 A1 | 12/2015 | Ouimet | |
| 2016/0086255 A1 | 3/2016 | Sainfort et al. | |
| 2016/0133140 A1 | 5/2016 | King et al. | |
| 2016/0253922 A1* | 9/2016 | Kremen | G09B 19/00 |
| 2016/0357941 A1 | 12/2016 | Wilkinson | |
| 2016/0379288 A1 | 12/2016 | Wilkinson et al. | |
| 2016/0379320 A1 | 12/2016 | Wilkinson | |
| 2018/0165747 A1 | 6/2018 | Patten et al. | |

OTHER PUBLICATIONS

U.S. Appl. No. 15/192,432, filed Jun. 24, 2016, Inventor(s): Wilkinson et al.

U.S. Appl. No. 15/173,169, filed Jun. 3, 2016, Inventor(s): Wilkinson.

International Preliminary Report on Patentability for corresponding International Application No. PCT/US2016/042835 dated Jan. 23, 2018; 6 pages.

International Search Report and Written Opinion for corresponding International Application No. PCT/US2016/042835 dated Oct. 4, 2016; 6 pages.

CA Examination Search Report for corresponding CA Application No. 2,993,010 dated Feb. 28, 2018; 6 pages.

Application and File History for U.S. Appl. No. 15/838,758, filed Dec. 12, 2017, inventors Thompson et al.

Application and File History for U.S. Appl. No. 15/192,014, filed Jun. 24, 2016, inventors Thompson et al.

Tesco., "Create Meal Plan," Tesco Real Food, retrieved from https://realfood.tesco.com/meal-planner/create-meal-plan.html, on Nov. 16, 2018, 2 pages.

* cited by examiner

Media File 300

| Media File Metadata 302 | Segment 306a | Segment 306b | Meal Data 304 | Segment 306c | Segment 306d | Segment 306e |
|---|---|---|---|---|---|---|
| | Segment Metadata 308a | Segment Metadata 308b | | Segment Metadata 308c | Segment Metadata 308d | Segment Metadata 308e |
| | Segment Thumbnail 310a | Segment Thumbnail 310b | | Segment Thumbnail 310c | Segment Thumbnail 310d | Segment Thumbnail 310e |

ANALYZING USER ACCESS OF MEDIA FOR MEAL PLANS

CROSS-REFERENCE TO RELATED APPLICATIONS

This application claims the benefit of U.S. Provisional Patent Application 62/194,496, filed Jul. 20, 2015, and titled "Analyzing User Access Of Media For Meal Plans", the entire contents of which are hereby incorporated herein by reference.

FIELD OF THE INVENTION

This invention relates to systems and methods for developing meal plans for a customer.

BACKGROUND OF THE INVENTION

Cooking delicious meals from basic ingredients is a great way to eat healthy. Trying out new recipes and enjoying the results is also enjoyable for many people. For people that work long hours or have small children, it may be difficult to find the time to buy fresh ingredients, even if one has the time to actually cook the meal. Likewise, it may take considerable time to review cooking magazines or recipe websites in order to find new recipes to try. A person may need to actually make many recipes before finding one that actually is suitable for the person's tastes.

The systems and methods described herein below provide an engine that provides meal plans that have a high likelihood of satisfying a person's tastes.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
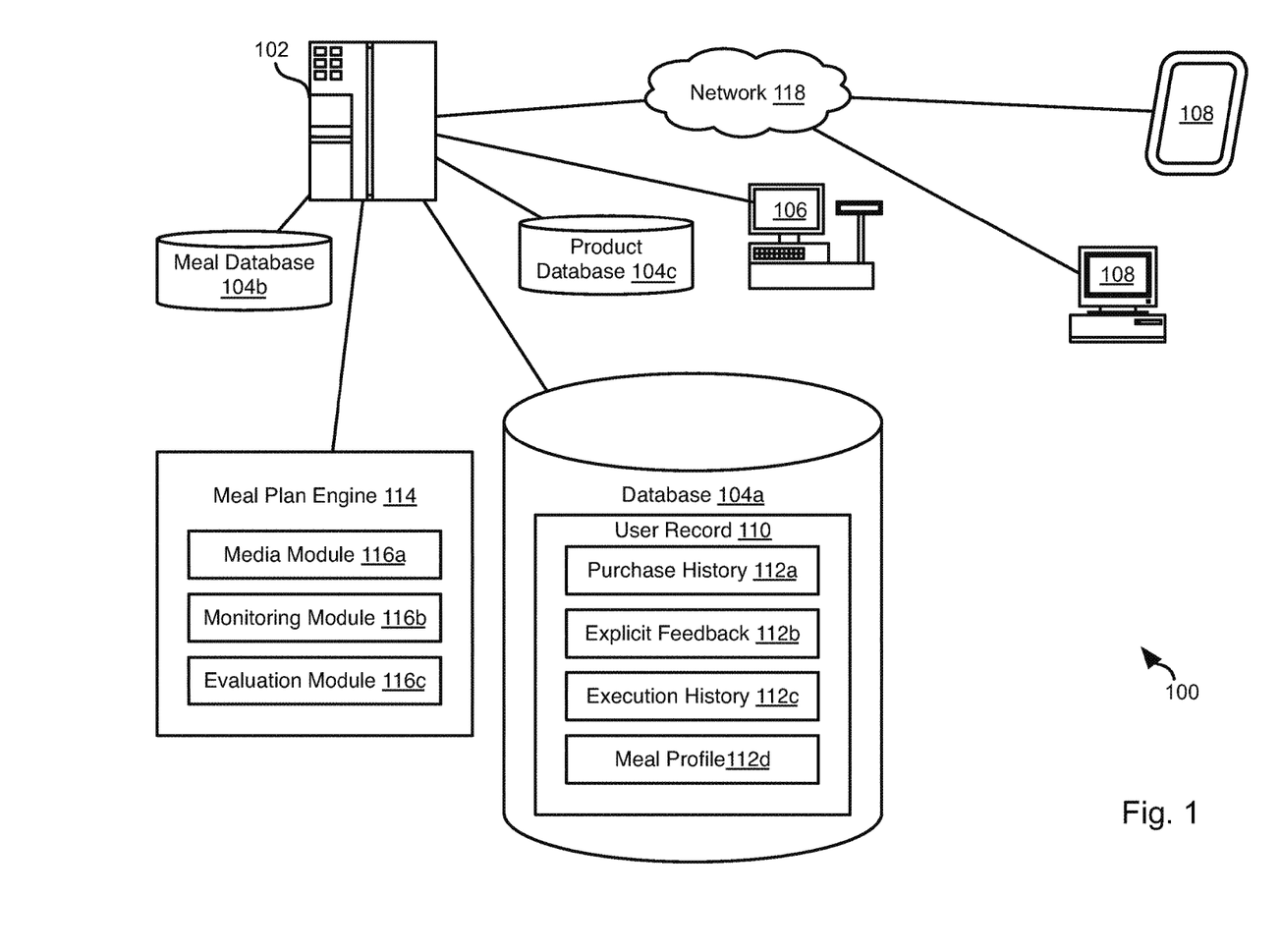
FIG. 1 is a schematic block diagram of a network environment suitable for implementing methods in accordance with embodiments of the invention.

Referring to FIG. 1, a network environment 100 may be used to implement methods as described herein. The environment 100 may include a server system 102 associated with a corporate parent or controlling entity having one or more retail establishments associated therewith. The server system 102 may host or access a database 104a of user data, a meal database 104b, and a product database 104c, which are described in greater detail below. The retail establishments may house point of sale devices (POS) 106 on which transactions may be concluded. The POS 106 may also be part of an e-commerce system. The e-commerce system may include, for example, a web-application that permits customers to purchase various products and/or services over the Internet. POSs 106 in communication with the server system 102 may include POSs 106 associated with a warehouse store that is a separate entity or format than the retail establishments.

Online POSs 106 may interact with remote user computers 108. In particular, server system 102 may host a website that may be browsed by users on the user computers 108 and through which the users may invoke purchase and shipment of products in a product database 104c. The remote user computers 108 may be embodied as laptop or desktop computers, mobile phones, tablet computers, wearable computers, or other computing device.

Records of transactions may be transmitted to the server system 102 by the POSs 106 at one or more outlets, e.g. retail establishments, warehouse stores, and ecommerce systems. The records of various transactions from the various outlets may be associated to individual customers. Specifically, unique data such as a credit card number, address, username, membership number, and the like may be associated with a particular customer. Accordingly, transaction records including one or more items of this unique data may be associated with that user. For example, transaction records determined to be associated with a particular user may be stored in a user record 110 for that user in the database 104a, such as in a purchase history 112a of the user record 110.

The user record 110 for that user may further include records of other information received from a user or gathered from observation of user actions. For example, the user record 110, may include explicit feedback 112b, an execution history 112c, and a meal profile 112d. Explicit feedback 112b may include responses of the user to questions regarding the user's tastes (e.g. food style, ingredients, etc.) or specific meals presented to the user as part of a meal plan or actually prepared by the user. The manner in which the execution history 112c and meal profile 112 are obtained and used is described in greater detail below.

The server system 102 may execute a meal plan engine 114 executing the methods described herein. A media module 116a may select meal plans and meals for each customer of a plurality of customers based on the data contained in the user record 110. The media module 116a may, for example, identify in the meal database 104b meals including ingredients and/or types of food that correspond to the meal profile 112d of a user and transmit media files from the meal database 104b that correspond to the meals to the user, e.g. a user device 106 associated with that user. The media file transmitted for a meal of the meal plan may include an instructional video that instructs the user how to prepare the meal.

A monitoring module 116b may receive notifications from user devices 108 regarding interactions with the media files selected and transmitted by the media module 116a. The evaluation module 116c may analyze notifications received and determine whether the notifications indicate viewing of the media file, viewing of a media file only for inspiration, or viewing during execution of a meal as instructed by the media file. The interactions received and the evaluation based thereon is discussed in greater detail below with respect to the methods of FIGS. 4 through 6 described below.

The server system 102 may be in data communication with the POSs 106 and user computers 108 by means of a network 118. The network 118 may include any wired or wireless connections and may include some or all of a local area network (LAN), wide area network (WAN), the Internet, or other type of network.

Figure 2:
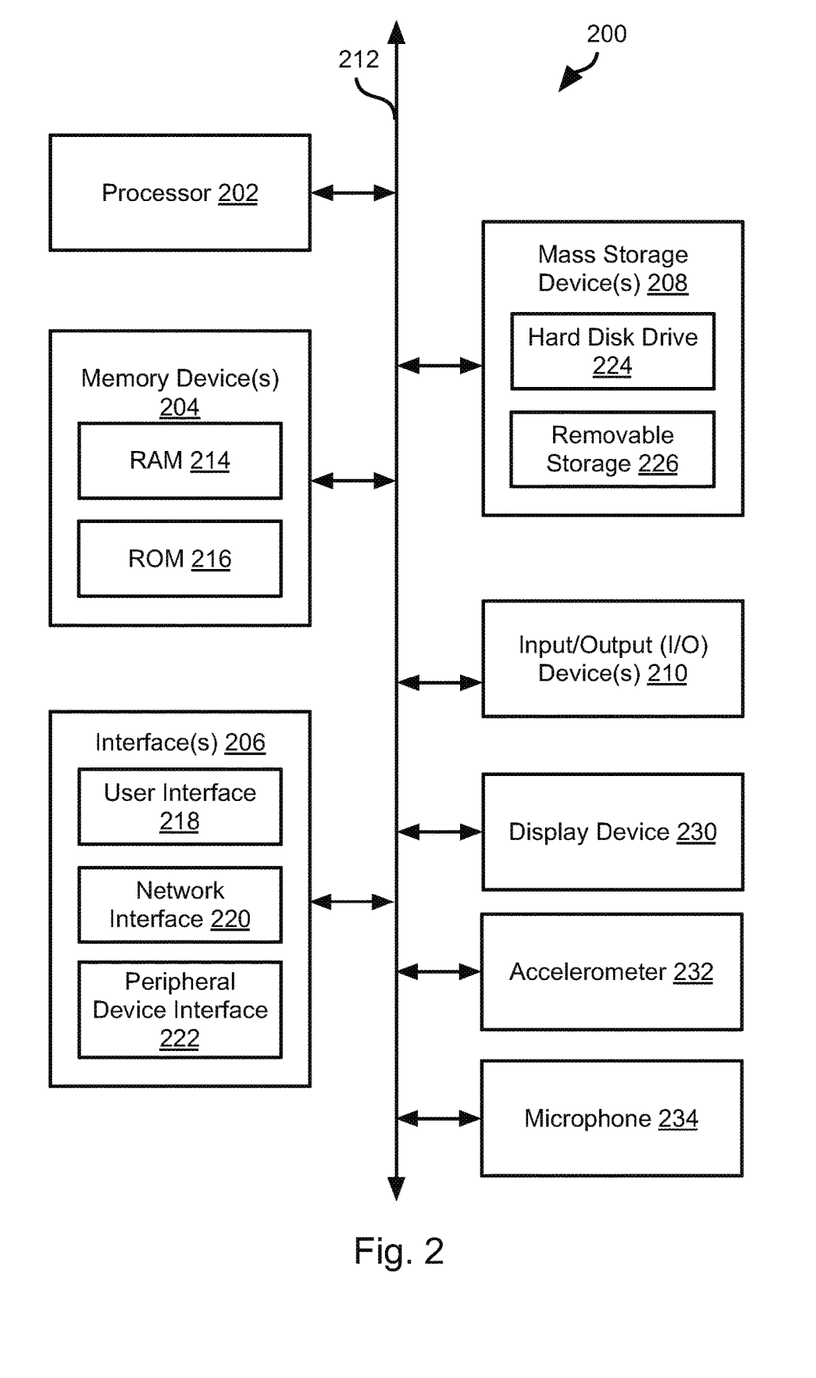
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The server system 102, POSs 106, and user computers 108 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, a tablet computer and the like. A server system 102 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

A computing device 200 implementing the user computers 108 may advantageously include one or more sensors. The output of these sensors may be used to determine whether a media file is viewed solely for inspiration or viewed during execution of a meal that the media file instructs how to prepare. In some embodiments, the sensors include an accelerometer 232 that detects acceleration of the user computer 108 in which it is included as well as the orientation thereof. In some embodiments, the sensors further include a microphone 234 capable of detecting sounds incident on the user computer 108.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
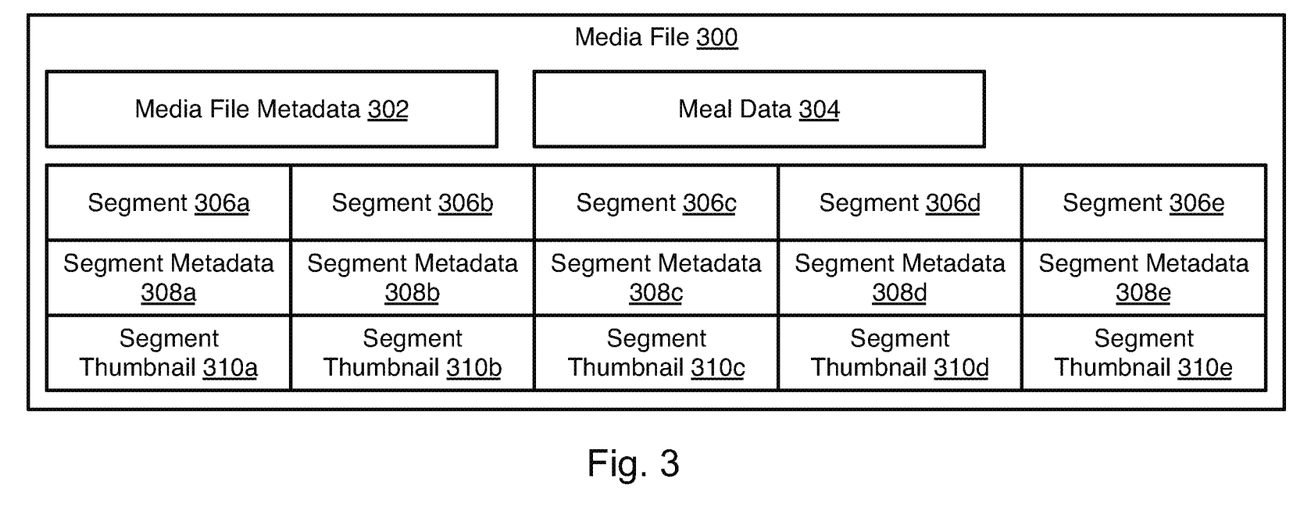
FIG. 3 is a schematic block diagram of a media file in accordance with an embodiment of the present invention.

Referring to FIG. 3, the meal database 104b may include media files 300 for some or all of the meals. The media file 300 for a meal may include audio, visual, or other type of media that, when played back, instructs how to prepare the meal corresponding to the media file.

The media file 300 may include, or have stored in association therewith, media file metadata 302. The media file metadata 302 may describe aspects of the media file as such, i.e. independent of the attributes of the meal instructed by the media file. The media file metadata 302 may include a length of the media file, attributes of the video composition of the media file, a description of the format or style of video included in the media file, or like information. For example, media file metadata 302 may indicate that the media file is composed to provide visually and/or audibly intense images that will emphasize freshness or flavor of the meal. The media file metadata 302 may indicate that the media file is composed to provide emphasize the ease with which a meal is prepared and provides quick and easy to understand instructions. Other visual or audible attributes describing the composition of the media file may also be included in the media file metadata 302.

The media file 300 may further include, or have stored in association therewith, meal data 304. The meal data 304 may include data describing the meal for which the media file 300 instructs preparation. Meal data 304 may include a list of ingredients for the meal, text of one or more recipes for dishes of the meal, calories per serving of the meal or dishes of the meal, preparation time (total and/or for individual dishes), a style of food or styles of food included in the meal, a complexity or effort required to prepare the meal, a value indicating a skill level required to prepare the meal or dishes of the meal, or other descriptors of the meal and the preparation thereof.

The media file 300 may include or define a plurality of segments 306a-306e. Segments 306a-306e may be stored as separate data objects or may be stored as a location within the media file, i.e. a location within the media file 300 at which the segment begins and/or ends. Each segment 306a-306e may include, or have store in association therewith, segment metadata 308a-308e. Segment metadata 308a-308e may include the same types of information noted above with respect to the media file metadata 302 or meal data 304 except that the segment metadata 308a-308e lists such information specifically describing the segment 306a-306e to which it corresponds. The segment metadata 308a may include some or all of the types of information included in the media file metadata 302 except that this information would be descriptive of the composition of the segment 306a. Likewise, the segment metadata 308a may include meal data 304 except that it describes a dish or portion of a dish for which the segment 306a instructs preparation. In some embodiments, segments 306a-306e may each include a different option for the meal instructed by the media file. For example, a portion of segments 306a-306e may represent a number of different toppings, e.g. sauces, for the meal. A portion of segments 306a-306e may represent a number of different options for sides to be served for the meal.

Each segment 306a-306e may include, or have stored in association therewith, a segment thumbnail 310a-310e. The segment thumbnail 310a-310e may be an image, e.g. a frame of the segment, that is representative of the corresponding segment 306a-306e and may be selected automatically or manually in order to provide a user interface element for invoking playback of that segment 306a-306e. In particular, the media file 300 may be presented on a user device 108 in an interface including interface elements for invoking playback of the entire media file 300 and for invoking playback of individual segments 306a-306e. The interface elements for invoking playback of segments 306a-306e may therefore be renderings of the segment thumbnails 310a-310e.

Figure 4:
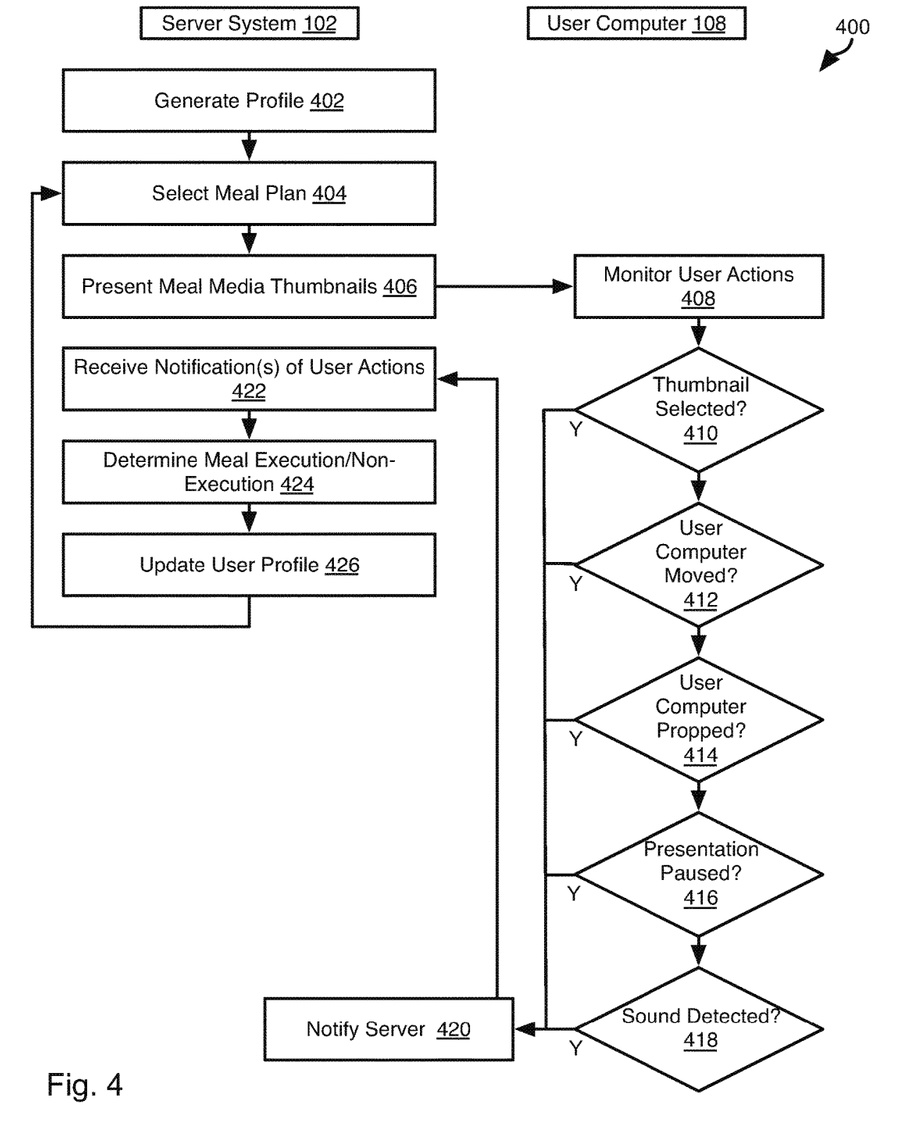
FIG. 4 is a process flow diagram of a method for evaluating user viewing of meal plan media in accordance with an embodiment of the present invention.

Turning now to FIG. 4, the illustrated method 400 may be executed by the server system 102 with respect to each user record 110 of a plurality of user records, the user record representing a specific customer, family, or other entity, hereinafter "the user."

The method 400 may include generating 402 a profile, e.g. an initial meal profile 112d for the user. The initial meal profile 112d may include information known about a user from the user record 110 or from previous iterations of the method 400. In particular, the initial meal profile 112d may include inferring favorite ingredients or styles of food from the purchase history of the user.

For example, the initial meal profile 112d may include generating a taste profile of the user from the purchase history 112a. For example, each transaction of the purchase history 112a may include a listing of product identifiers. The method 400 may include mapping product identifiers or groups of product identifiers to a particular type of food. For example, product identifiers for tortillas, salsa, cilantro, limes, etc. may correspond to Mexican food. Product identifiers for soy sauce, bean sprouts, etc. may correspond to Chinese food. Of course, some ingredients may be used in multiple styles of cooking, such as cilantro, which may be used in both Mexican and Chinese food. Accordingly, determining a taste profile may include identifying groups of ingredients in the same or different transaction that overlap with a grouping of ingredients corresponding to a particular style of food. The style of food having the greatest number of products of a transaction included in its grouping of ingredients as opposed to other styles of food may be determined to be the style of food for that transaction. The style of food preference may be determined for each transaction or based on an aggregation of products for a plurality of transactions. For example, each transaction, or a group of transactions that are temporally proximate (e.g. within 5, 10, 15, or N days apart), may be analyzed and a style of food identified therefore. The styles of foods identified for a plurality of transactions or plurality of groups of transactions may be determined. The top M styles of foods, e.g. having the top M greatest numbers of transactions or groups of transactions mapped thereto may be selected as the customer's preferred styles of food. Attributes of meals determined from the ingredients may further include values of aesthetics, nutritional value, health benefits, and the like. Any methods known in the art may be used to determine a user's taste preference based on past purchases.

Generating 402 the meal profile 112d may include generating the taste profile as described above from a purchase history 112a as well as from explicit feedback 112b regarding meals presented to the user, e.g. including in the profile 112d data that indicates favorability of the user for attributes of meals the user indicated a liking for and indicates disfavor for attributes of meals the user indicated a dislike for. Generating 402 the profile may include storing in the profile 112d data indicating favoring of the user for attributes of meals actually executed by the user as determined according to the methods described herein. Generating 402 the profile may include storing in the profile 112d data indicating disfavoring of the user for attributes of meals not actually executed by the user as determined according to the methods described herein. The attributes of meals may include ingredients of the meals, a style of food of the meals, or any other attributes of the meal or portion of the meal.

The method 400 may further include selecting 404 a meal plan according to the meal profile 112d. For example, the meal database 104b may store a plurality of meals, i.e. data describing the meal including the ingredients, style of food, cooking methods, recipes, and instructional media files. Selecting 404 the meal plan may include selecting a set of meals that include ingredients, style of foods, and/or other attributes found in the meal profile 112d of the user. The meals selected 404 may also be selected so as to include diverse meals that provide an appropriate amount of variety while still corresponding to the meal profile 112d of the user.

Subsequent steps of the method 400 may be performed with respect to each meal of a meal plan selected at step 404, hereinafter "the meal" and "the media file" being the media file instructing preparation of the meal. The media file may be embodied as multiple media files each instructing preparation of a different portion of the meal.

The method 400 may include presenting 406 the media file to the user, such as by transmitting the media file, a link to the media file, or other data sufficient to enable access of the media file to the user computer 108 of the user. The step of selecting 404 a meal plan and presenting 406 the media files for meals of the meal plan may be performed by the media module 116a. Presenting 406 the media files may include presenting an interface including thumbnail images 310a-310e for the media file to enable a user to invoke playback of individual segments and/or the entire media file.

A software component on the user computer 108, such as a browser plug in, application, or other software code may monitor 408 user actions with respect to the media file, including actions taken with respect to individual segments 306a-306e of the media file. Actions detected during monitoring 408 may include selection of a thumbnail for playback of a segment, pausing of playback of the media file or segment of the media file, movement (or lack of movement) of the user computer 108 during playback of the media file or segment of the media file, an orientation of the user computer 108 during playback of the media file, sounds detected during playback of the media file or segment of the media file. Activity sensed "during playback of the media file or segment of the media file" may include activity sensed while playback is paused and/or activity occurring subsequent to invoking of playback, e.g. after detecting invoking of playback and prior to stopping of playback or some predetermined time period subsequent to pausing or stopping of playback of the media file or segment of the media file due to a user instruction to do so or reaching the end of the media file or segment of the media file during playback.

If the user actions detected during monitoring 408 are found 410 to indicate selection of a thumbnail, found 412 to indicate movement, found 414 to indicate that the user computer was laid flat or propped up during playback, found 416 to indicate pausing of playback of the media file, or found 418 to include detected sound, then the user computer 108 may notify 420 the server of some or all of these user actions detected. Notification 420 may be performed repeatedly as actions are found 410-416 to have been detected or sent after playback is determined to have concluded.

Other notifications of other sensors may also be performed 420. For example, a user device may include or communicate with a thermometer. The temperature at the time of playing back the media file or thereafter may be recorded and transmitted to the server system. The server system 102 may conclude that a rise in temperature subsequent or during playback indicates baking or other cooking activity. Likewise, outputs from wireless enabled cooking appliances may be received by the user device 108 and transmitted to the server 102 to determine whether the use of the appliances is consistent with a cooking step in a segment of the media file that has been played back to the user.

The receiving of notifications may be performed by the monitoring module 116c. Detecting playback to have been concluded may include detecting stopping of playback or some predetermined time period subsequent to pausing or stopping of playback of the media file or segment of the media file due to a user instruction to do so or reaching the end of the media file or segment of the media file during playback. Playback may also be determined to have ended due to a user closing an application in which playback is being performed, e.g. a video presentation application. In some embodiments, user actions with respect to the media file or segment of the media file may be monitored 408 and the server 102 notified 402 for a period of time subsequent to presentation 406 of the meal plan. For example, if the meal plan is for meal (breakfast, lunch, dinner), then actions occurring during a window of time in which that meal is likely to be prepared may be monitored 408 and the server 102 notified 420 thereof. In some embodiments, the window of time may include a window of time subsequent to a user first initiating playback, e.g. all actions with respect to the media file X hours after first initiating playback of the media file may be reported to the server system 102.

The server system 102 may then receive 422 the notification of the user actions and determine 424 whether the user actions with respect to the media file or segment of the media file indicate one or more viewings of the media file or segment of the media file and whether any viewings of the media file or segment of the media file were for execution of the meal for which the media file instructs preparation or the portion of a meal for which the segment instructs preparation. For example, step 424 may include executing the method 500 of FIG. 5 with respect to the user actions received at step 422.

The profile of the user, e.g. the meal profile 112d, may be updated 426. The profile of the user may be updated in various ways. For example, preparation of the meal instructed by the media file may require a certain amount of each ingredient of the meal. Accordingly, updating 426 the profile of the user may include decrementing in an inventory recorded amounts associated with each of the ingredient of the meal by the amount of the each ingredient required by the recipe.

Updating 426 the profile of the user may include updating the meal profile 112d of the user to favor selection of meals having attributes (ingredients, style of food, etc.) similar to the meal instructed by the media file if the media file is determined 424 to have been viewed for execution. Updating 426 the meal profile 112d of the user may include updating the profile of the user to disfavor selection of meals having attributes similar to the meal instructed by the media file of if the media file is determined 424 not to have been viewed for execution (e.g. not viewed for viewed only for inspiration as described herein). In a like manner the meal profile 112d may be updated to favor selection of meals and dishes having attributes of segments determined to have been viewed for execution and to disfavor selection of meals and dishes having attributes of segments determined not to have been viewed for execution.

Figure 5:
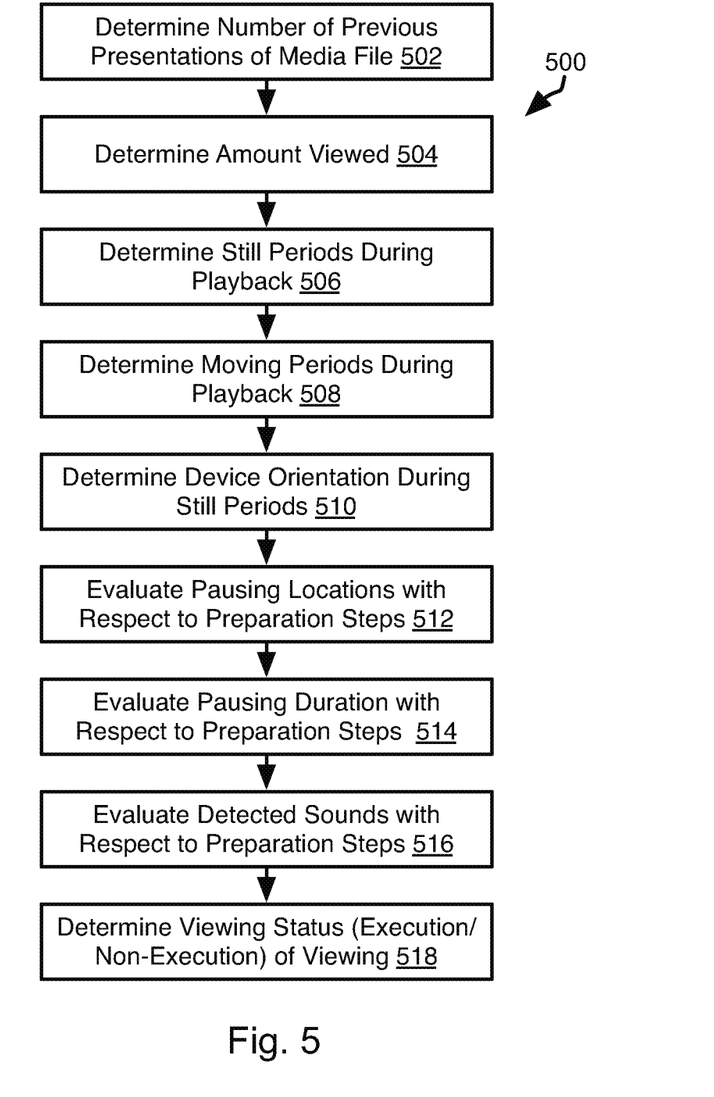
FIG. 5 is a process flow diagram of a method for determining whether a viewing of meal plan media was for inspiration or for facilitating execution of a meal in accordance with an embodiment of the present invention.

FIG. 5 illustrates a method 500 for determining 424 whether a media file or segment of a media file was viewed for inspiration or for execution and otherwise assessing a user response to the media file or segment of a media file. The method 500 may be executed by the server system 102, such as by the evaluation module 116c. The method 500 may be performed with respect to user actions taken with respect to the media file or segment of a media file on a user computer 108 of a user, such as described above with respect to FIG. 4. For the remainder of discussion of the method 500, references to a media file may refer to a segment of a media file in a same manner. In other words, the viewing status of segments of a media file may be determined separately in the same manner as the viewing status of a media file is determined according to the method 500 as described below. In particular, the method 500 may be executed once for each segment of a media file and/or for the entirety of the media file.

As described in detail below various determinations or characterizations may be made at steps 502-518 regarding the user actions detected with respect to a media file. Based on some or all of these determinations either individually or as a combination, whether the media file was viewed for execution or inspiration may be determined 520.

In some embodiments, the user actions may be evaluated to determine 502 a number of previous presentations of the media file. As discussed in greater detail below, whether a viewing is deemed for inspiration or for execution is determined based on calculations with respect to user actions. The determination of whether a given set of user actions is deemed to indicate viewing of a media for inspiration or execution may be a function of a number of times that a user has been presented with the media file as well as the user actions themselves, as described in greater detail below. Determining 502 the number of previous presentations of the media file may include determining a number of times that the meal corresponding to the media file was selected for that user and for which the media file was accessed. Alternatively, determining 502 the number of previous presentations of the media file may simply be a total of a number of times the user has viewed the media file, such as detected based on user actions as described herein.

The method 500 may further include determining 504 an amount of the media file viewed. An output of step 504 may be a score that is a function of a percentage of the media file actually played back on the user computer 108. Step 504 may further include determining a number of viewings of the media file by the user based on the user actions received. Determining 504 an amount of the media file viewed may include determining which of the segments were played back or were played back in each viewing.

The method 500 may further include determining 506 still periods during playback of the media file. Specifically, for each viewing of one or more viewings of the media file, a portion of the viewing during which the user computer 108 was still (e.g. placed on a surface rather than being held by a user), may be determined for the each viewing. Whether the user computer 108 was still at a moment in time may be determined from an output of an accelerometer 232 of the user computer 108 or from a notification from the user computer 108 derived from an output of the accelerometer 232. Whether the user computer 108 is "still" may be determined by determining whether the output of the accelerometer 232 indicates acceleration below a first acceleration threshold.

An output of step 506 may be a score that increases with an amount of time that the user computer was still during the each viewing. A score based on the determined 506 still periods may be output for each viewing of one or more viewings of the media file as part of the step 506.

The method 500 may include determining 508 moving periods during each of the one or more viewings. Moving periods may be periods not determined to be still periods in step 506. Moving periods during a viewing may be periods in which the output of the accelerometer 232 indicates acceleration above a second acceleration threshold that is higher than the first acceleration threshold. An output of the step 508 may be a score for each viewing that decreases with the amount of time during the each moving that acceleration above the second threshold (or the first threshold in some embodiments) occurred. In some embodiment, the score for each viewing from step 508 may decrease with the magnitude of the acceleration occurring during the each viewing.

The method 500 may include determining 510 device orientation during one or more viewings of the media file, specifically during still periods identified at step 506. An output of step 510 may be a score for each viewing of one or more viewings of the media file, the score for each viewing increasing with an amount of time during the each viewing during which the user device 108 is propped at an angle or laid flat. Such an orientation is consistent with a user placing the device on a counter in order to perform a cooking step instructed by the media file.

The method 500 may further include evaluating 512 pausing locations with respect to preparation steps in the media file. In some embodiments, a media file may have associated therewith data identifying expected pausing locations. Each pausing location may correspond to, for example, the end of a portion of the video instructing how to perform a specific cooking step. Accordingly, whether the user pauses at these locations may be determined from the notifications of user actions with respect to the media file. For example, an output of step 512 may be a score for each viewing that increases with a number of the pausing locations for which a pausing of the each viewing occurred within predetermined threshold proximity of the pausing location.

The method 500 may further include evaluating 514 pausing duration with respect to the preparation step just played back. As noted above, a media file may have a plurality of segments and store metadata defining the segments and including other data for each segment. In some embodiments, a segment may have a preparation time associated therewith that indicates how long the step should take or is likely to take. For example, where a preparation step is "fry steak for five minutes," the preparation time for that segment may be five minutes. Accordingly, step 514 may include evaluating the duration of a pause following playback of that segment and compare it to the five-minute preparation time.

The output of step 514 may be a score that increases with the closeness of the duration of pauses to the preparation times associated with segments viewed immediately before the pauses. Stated differently, a score may be output for each viewing at 514, the score for each viewing being augmented for each segment followed by a pause in the each viewing, the amount increasing with closeness of the length of the pause to a preparation time included in the metadata for the each segment. Where the method 500 is being performed with respect to an individual segment, the score for step may increase with closeness of a pausing length to a preparation time included in the metadata for that segment.

In some embodiments, the systems and methods provided herein may include outputting alerts on the user device 108 if a pause exceeds the preparation time. Specifically, if, during playback, playback is paused, a timer may be started. Upon the timer exceeding a preparation time associated with the segment being played back when playback was paused, an alert may be output on the user device 108 thereby instructing the user that the preparation time has been reached and it is time to move on to another preparation step, e.g. take food out of the oven or frying pan, etc.

The method 500 may further include evaluating 516 sounds detected during each viewing of the one or more viewings. For example, where the media file includes a segment instructing to perform a frying step, sounds detected subsequent to playback of that segment during the each viewing may be evaluated to determine whether sounds of frying food were detected (e.g. sizzling). Likewise, for a step including mixing, whether sounds of an electric mixer or manual mixing are detected subsequent to playback of a segment instructing performance of a mixing may be detected. An output of step 516 may be a score for each viewing that increases with a number of segments of the media file for which a sound corresponding to each segment of the number of segments is detected subsequent or during playback of the each segment. In some embodiment, the reference sounds against which detected sounds are compared may be recorded from previous executions of the meal by the user, i.e. recorded during a previous viewing of the media file. Accordingly, the sounds typical of the user after a particular type of cooking step may be recorded and used as a reference during a subsequent viewing. Similarity between detected sounds for a cooking step instructed by the media file and previously recorded sounds for the same type of cooking step (e.g. sautéing) may be used by the server system to determine 518 that that cooking step was actually executed.

Where the method 500 is being executed with respect to an individual segment, the output of step 516 may increase with correspondence between sounds occurring during or after playback of the segment and a reference sound in the metadata for that segment.

The method 500 may conclude with evaluating the scores calculated according to some or all of the steps 504-516. For example, the scores calculated according to steps 504-516 may be summed, weighted and summed, or otherwise combined to obtain a final score. The scores for each viewing of one or more viewings of the media file may be summed, weighted and summed, or otherwise combined to obtain a final score for each viewing. The final score for each viewing may then be evaluated to determine 518 whether the each viewing indicates that the each viewing was performed during execution of the meal or not. Viewings not performed for execution may be deemed viewed for inspiration. For example, the final score for a viewing may be compared to a threshold with final scores above the threshold indicating viewing for execution and final scores below the threshold indicating viewing for inspiration.

As noted above, the criteria by which user actions are evaluated to determine 518 the status (e.g. for inspiration or execution) of a viewing may vary based on whether the customer has been presented a media file previously. For example, a user may have previously been presented the media file for execution on a preceding date when the meal associated with the media file was included in a first meal plan of the user. In a second meal plan with the meal scheduled on a different date, the media file may again be presented. Accordingly, if in the first meal plan and the first presentation of the media file, the media file was determined to have been viewed for execution, the criteria by which the user actions are evaluated following a second presentation of the media file may be different.

In a like manner, the criteria by which user actions are determined 518 to indicate viewing for execution or not may change as a function of a number of previous viewings deemed to have been for execution. For example, the threshold against which the final scores are compared may decrease with increase in the number of previous viewings determined to be for execution.

For example the criteria may be changed by some or all of, (a) applying a different weighting to the scores of any of the steps 504-516, (b) reducing a threshold against which the final score is compared to determine whether a viewing was for execution, (c) or other changes may be made to the function by which the scores of steps 504-516 are combined into a final score and the final score is processed to product a binary output indicating either viewing for execution or not. In general, the scores for the interactions of steps 504-516 that will result in a viewing being determined 518 to be for execution according to the method 500 decrease with the number of preceding findings of viewings made for execution in a previous presentation of the media file as part of a preceding meal plan or date of the meal being assigned to the user.

In some embodiments, the criteria by which a media file is determined to be viewed for execution or inspiration based on a given set of detected user actions may be determined according to a user-specific model. The user-specific model may take as training data for each media file of a plurality of media files, user actions detected with respect to each viewing of media file, the number of previous viewings for execution of the media file preceding the each viewing, and responses from to explicit requests for information, i.e. "did you actually prepare this meal?" A machine-learning model may then be trained to correlate user actions and number of preceding viewings for execution to the viewing status of a viewing of a media file. Determining 518 the viewing status of a viewing may therefore be performed by inputting user actions or scores based on user actions and a number of preceding viewings for execution to this trained model and receiving as an output indicating whether the model indicates that the viewing was for execution or inspiration.

Figure 6:
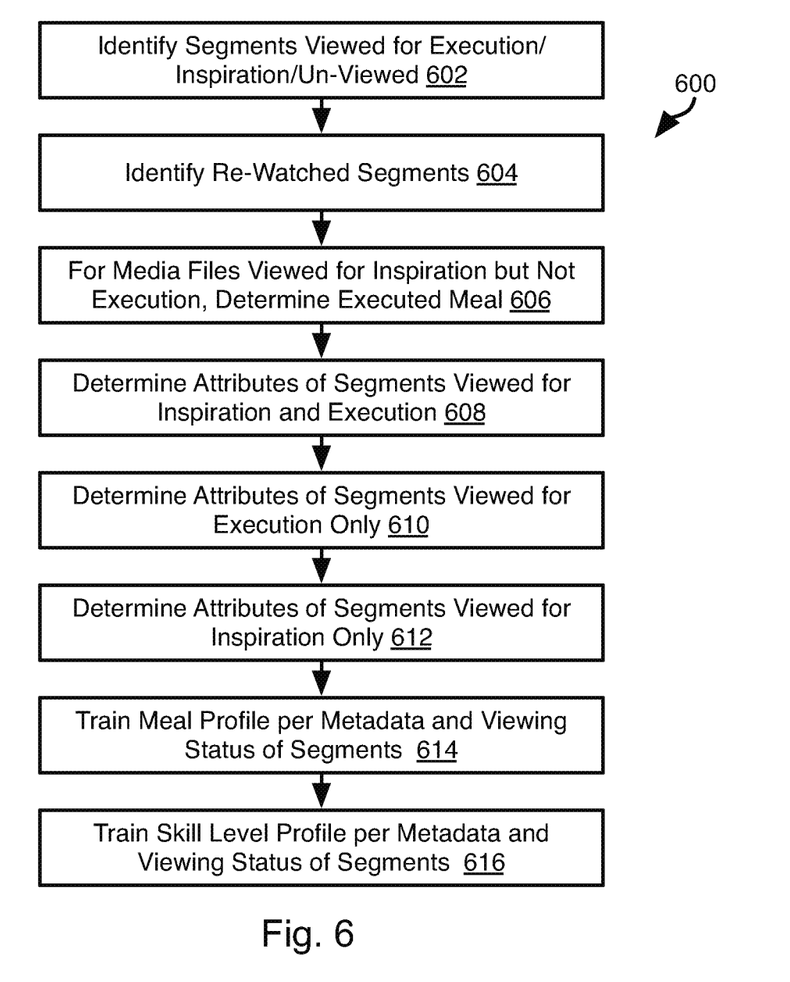
FIG. 6 is a process flow diagram of a method for analyzing media files based on attributes and viewing status in accordance with an embodiment of the present invention.

Referring to FIG. 6, the illustrated method 600 may be executed by the server system 102 with respect to one or more users using determinations for one or more media files according to the method 500 of FIG. 5. In particular, for a media file, the determinations of whether viewings are for inspiration or execution may be evaluated according to the method 600. As described in detail below, the method 600 may be performed with respect to segments of media files or may be performed with respect to entire media files. Specifically, the method 600 may for a plurality of segments, evaluate each segment's viewing status (viewed for inspiration, execution, or not viewed) and attributes. Alternatively, the method 600 may evaluate the viewing status and attributes of media files without regard to individual segments.

The method 600 described below evaluates that attributes of media files and/or segments of media files, such as the attributes are recorded in the metadata of the media files and/or segments. The method 600 may omit evaluation of the actual attributes of the meal instructed by a media file or segment, but rather evaluate attributes describing the composition and other attributes of the media files in order to determine the visual, audible, and content formatting of a media file that is likely to encourage a user to actually execute a meal of a meal plan. For example, attributes may include audible appeal, visual appeal, instructional utility, time requirement, informativeness, and complexity appeal of the media file or segment. Accordingly, media files and/or segments may have such attributes associated therewith in order to enable correlation of these attributes to the execution and non-execution of a meal for which the media files instruct preparation.

The systems and methods disclosed herein may further include updating the meal profile 112d according to attributes of the meals instructed by media files to favor selection of meals including ingredients, styles of foods, and other culinary attributes of meals actually executed by the user as determined according to the methods described herein, e.g. the media file of the meal determined to have been viewed for execution.

Among media files presented to the user, the method 600 may include some or all of identifying 602 any media files and segments of media files viewed for execution, inspiration, or unviewed. The manner by which a segment is determined to have been unviewed, viewed for inspiration, or viewed for execution may be performed as for a media file and may include performing evaluation of some or all of the user actions performed with respect to the segment as described above with respect to the method 500 of FIG. 5.

The method 600 may further include determining 604 segments of a media file that were re-watched. For example, within a viewing of the media file the user may rewind or otherwise re-invoke playback of one or more segments. The segments that are re-watched as a part of an individual viewing of the media file may be recorded and particularly the attributes recorded in the metadata thereof.

The method 600 may further include determining 606 for one or more first media files for which the first media file was viewed for inspiration but not execution while a second media file was viewed for execution on the date on which the meal corresponding to the first media file was scheduled to be prepared by the user in a meal plan. In particular, the attributes of the first media files viewed for inspiration and not execution may be recorded and the attributes of the second media files that were substituted for the first media files may also be noted.

The method 600 may further include determining 608 attributes of media files and/or segments viewed for both inspiration and execution and viewed for inspiration exclusively. In some embodiments, media files and/or segments viewed for both inspiration and execution may be grouped separately from media files and/or segments viewed solely for execution. In other embodiments, they are grouped together. In either case, for the one grouping or separate groupings, the attributes of media files and/or segments belonging to the grouping may be obtained, such as from data indicating such attributes in meta data associated with each media file or each segment of each media file.

The method 600 may further include determining 610 attributes of media files and/or segments viewed for execution only without a preceding viewing for inspiration. Media files and/or segments viewed for execution may include media files and/or segments partially or completely viewed and that the method 500 indicates were viewed for execution without a subsequent or preceding viewing for inspiration.

The method 600 may further include determining 612 attributes of media files and/or segments viewed for inspiration but not execution from the metadata associated with the media files and/or segments. Media files and/or segments viewed for inspiration may include media files and/or segments partially or completely viewed and that the method 500 indicates were viewed for inspiration without a subsequent viewing for execution.

Determining 608-612 the attributes for a particular grouping of media files or segments may include calculating a statistical characterization of the attributes represented in a grouping of media files or segments, e.g. a number of media files or segments in the grouping having the attribute. The attributes may be sorted such that the most frequently occurring attributes are at a top of a list and/or all but the top N attributes represented in a grouping are eliminated or ignored from a listing of attributes for a grouping of media files.

The method 600 may further include using the attributes of the groupings as determined at steps 608-612 in order to train 614 a model. In particular, the media files or segments presented to a user or group of users along with their attributes and the viewing status thereof may be used to train a model that relates attributes of a media file or segment to the likelihood that the media file or segment will be viewed for execution by the user or group of users. Alternatively, reports may be produced based on statistical characterizations of the attributes for the different groupings in order to indicate what attributes are most successful in motivating the user or group of users to actually execute a meal instructed by a media file.

In a like manner, the viewing status of a media file for a plurality of users may be analyzed to determine for each segment of the media file the percentage of users that watched the each segment for inspiration, watched the each segment for execution, didn't watch the each segment, or re-watched the each segment. In this manner, the effectiveness of a video may be determined and the video may be edited or remade in order to more effectively inspire users to execute the meal instructed by the media file.

Training 614 the model may include training a model to select media files for a user or group of users. For example, the model may be used to select subsequent media files for other meals selected for the user that have attributes similar to those determined for media files viewed for execution and refraining from selecting subsequent media files for the other meals selected for the user that have attributes similar to those determined for media files not viewed for execution (e.g. not viewed at all or viewed only for inspiration). Stated differently, the model may be trained 614 to select, or favoring selection of, media files for subsequent meals that have attributes more similar to the attributes of media files determined to have been viewed for execution than to the attributes of media files determined not to have been viewed for execution. Likewise, the model may be trained 614 to refrain from selecting, or disfavoring selection of, media files for subsequent meals that have attributes more similar to the attributes of media files determined to not to have been viewed for execution than to the attributes of media files determined to have been viewed for execution. In some embodiments, selecting 512 media files for subsequent meals may include selecting the media files as part of an iteration of the method 300 of FIG. 3, e.g. the presentation step 306.

In some embodiments, the same meal may have multiple media files instructing how to prepare that same meal but having different attributes, i.e. video composition attributes. For example, a first media file may commence, or include throughout, visually intense images showing the meal as prepared and/or meal preparation steps. A second media file for the same meal may commence with, or include throughout, audible, textual, and/or visual information that provides essential information quickly and a readily understandable manner. For example, the second video may include information (audible, textual, or visual) that emphasizes the ease of preparation for the meal and providing a rapid understanding of steps required to prepare the meal.

Accordingly, where previously-presented media files to the user and viewed for execution by the user have attributes more similar to the first media file than the second media file and/or the previously presented media files not viewed for execution by the user have attributes more similar to the second media file than the first media file, the first media file will be selected. Where the previously-presented media files to the user and viewed for execution by the user have attributes more similar to the second media file than the first media file and/or the previously presented media files not viewed for execution by the user have attributes more similar to the first media file than the second media file, the second media file will be selected.

In some embodiments, users having similar profiles, i.e. that have attributes of media files viewed for execution and/or media files viewed for execution, that meet some threshold condition for similarity (e.g. above 95%, or some other value, of commonality of the top N attributes), may be clustered together and media files selected for users of that cluster that are more likely to inspire the users of that cluster to actually execute a meal.

The systems and methods described herein disclose the evaluation of user behavior with respect to media files. In some embodiments, the methods may be applied in a like manner to segments of a media file. In particular, whether a segment of a media file has a particular viewing status (e.g. viewed, viewed for inspiration, viewed for execution, or viewed for execution subsequent to a viewing for inspiration) may be determined according to the methods disclosed herein. Likewise, the attributes of segments of a media file and the viewing status thereof may be used to determine attributes likely to inspire execution and those less likely to inspire execution in the same manner described above with respect to media files.

The method 600 may further include training 616 a skill level profile of the user according to the metadata and viewing status of the segments viewed by the user. In particular, the metadata for a segment may indicate a skill level required to perform the cooking step instructed by the segment, such as in the form of a score that increases (or decreases) with the skill required to perform the step. Accordingly, these scores may be evaluated for segments viewed by the user in order to a distribution of the skill level of segments viewed by the user. In some embodiments, a distribution of skill level scores for segments of media files not viewed by the user may also be determined. Where the distribution for viewed segments indicates a low frequency (e.g. below a predetermined frequency threshold) of viewing segments below a given skill level, the skill level profile of the user may be updated to indicate that the user has at least the given skill level. For example, if less than X percent, e.g. 20, 15, 5, or some other threshold percentage, of the segments viewed are at a skill level N−1 or below, the user's skill level may be determined to be at least N−1, or N in some embodiments.

The skill level of the user determined at step 616 may be stored in the meal profile 112d of the user. Meals may then be selected by the media module 114 that both correspond to the food preferences of the user and require a skill level at or near the skill level determined at step 616. For example, meals may be selected that have a skill level no higher than N, where N is the skill level of the user and M is an integer such as 1, 2, or some other value.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A system for evaluating consumer behavior, the system comprising:
   a customer knowledge database storing a customer profile for each customer of a plurality of customers, the customer profile for the each customer including a purchase history of items purchased by the each customer and a meal plan history of meal plans executed by the each customer;
   a meal media database including a plurality of media files, each media file of the plurality of media files including video content instructing how to prepare a meal and including a plurality of segments, each segment of the plurality of segments corresponding to a different step in preparing the meal and having ingredient attributes and difficulty level attributes associated therewith; and
   a server system comprising one or more processors and one or more memory devices operably coupled to the one or more processors, the one or more memory devices storing executable and operational code effective to execute a supply chain engine comprising—
      a meal plan module effective to generate, for each customer of the plurality of customers, a meal plan including meals including styles of food and ingredients corresponding to the purchase history and meal plan history of the each customer;
      a media module effective to, for each meal of the meal plan for each customer of the plurality of customers, retrieve a media file from the plurality of media files corresponding to the each meal and transmit the media file to the each customer on a date corresponding to the each meal in the meal plan; and
      a monitoring module effective to monitor access of the media files by the plurality of customers, receive notifications from sensors of a mobile device of the each customer, the notifications including an output of an accelerometer indicating an orientation of the mobile device, during access of any segments of a media file accessed by the each customer, determine from the notifications that the customer is executing the meal corresponding to the media file accessed by the each customer and, for each customer of the plurality of customers, update the customer profile of the each customer according to the ingredient attributes and difficulty level attributes of any segments of the media files accessed by the each customer.

2. The system of claim 1, wherein the media module is further effective to transmit the media file with an interface including thumbnails each effective to invoke playback of a segment of the plurality of segments of the media file.

3. The system of claim 1, wherein a portion of the segments of the plurality of segments represent different sides for inclusion in the each meal.

4. The system of claim 1, wherein a portion of the segments of the plurality of segments represent a plurality of options for executing the each meal.

5. The system of claim 1, wherein the monitoring module is further effective to:
   determine a skill level of the each customer according to the difficulty level of any segments of the media files accessed by the each customer;
   update the profile of the user to record the skill level.

6. The system of claim 5, wherein the meal plan module is further effective to select meals for the plurality of customers corresponding to the skill levels of the customer profiles of the plurality of customers.

7. The system of claim 1, wherein the notifications include an output of the accelerometer indicating movement of the mobile device of the each customer.

8. The system of claim 1, wherein the notifications include an output of a microphone.

9. A method for evaluating consumer behavior, the method comprising:
   storing, by a server system, in a customer knowledge database, a customer profile for each customer of a plurality of customers, the customer profile for the each customer including a purchase history of items purchased by the each customer and a meal plan history of meal plans executed by the each customer;
   storing, by a server system, a meal media database including a plurality of media files, each media file of the plurality of media files including video content instructing how to prepare a meal and including a plurality of segments, each segment of the plurality of segments corresponding to a different step in preparing the meal and having ingredient attributes and difficulty level attributes associated therewith;
   generating, by the server system, for each customer of the plurality of customers, a meal plan including meals including styles of food and ingredients corresponding to the customer profile of the each customer; and
   for each meal of the meal plan for each customer of the plurality of customers—
      (a) retrieving a media file from the plurality of media files corresponding to the each meal;
      (b) transmitting the media file to the each customer on a date corresponding to the each meal in the meal plan;
      (c) monitoring access of the media files by the each customer by receiving notifications from sensors of a mobile device of the each customer during access of any segments of a media file accessed by the each customer, the notifications including the output of an accelerometer indicating an orientation of the mobile device of the each customer, and determining from the notifications that the each customer is executing the meal corresponding to the media file accessed by the each customer;
      (d) updating the customer profile of the each customer according to the ingredient attributes and difficulty level attributes of any segments of the media files accessed by the each customer.

10. The method of claim 9, wherein the media module is further effective to transmit the media file with an interface including thumbnails each effective to invoke playback of a segment of the plurality of segments of the media file.

11. The method of claim 9, wherein a portion of the segments of the plurality of segments represent different sides for inclusion in the each meal.

12. The method of claim 9, wherein a portion of the segments of the plurality of segments represent a plurality of options for executing the each meal.

13. The method of claim 9, wherein updating the customer profile of the each customer according to the ingredient attributes and difficulty level attributes of any segments of the media files accessed by the each customer further comprises:
   determining a skill level of the each customer according to the difficulty level of any segments of the media files accessed by the each customer; and
   updating the profile of the user to record the skill level.

14. The method of claim 13, further comprising selecting meals for the plurality of customers corresponding to the skill levels of the customer profiles of the plurality of customers.

15. The method of claim 9, wherein the notifications include an output of the accelerometer indicating movement of the mobile device of the each customer.

16. The method of claim 9, wherein the notifications include an output of a microphone.

* * * * *